United States Patent
Sakai

(10) Patent No.: US 7,140,757 B2
(45) Date of Patent: Nov. 28, 2006

(54) VEHICLE MIRROR ASSEMBLY THAT INCLUDES LIGHT UNIT

(75) Inventor: Takako Sakai, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 86 days.

(21) Appl. No.: 11/017,221

(22) Filed: Dec. 21, 2004

(65) Prior Publication Data

US 2005/0141229 A1    Jun. 30, 2005

(30) Foreign Application Priority Data

Dec. 24, 2003    (JP)    ............... 2003-427574

(51) Int. Cl.
*B60Q 1/26* (2006.01)
*B60R 1/12* (2006.01)

(52) U.S. Cl. ................................... 362/494
(58) Field of Classification Search ............... 362/494
See application file for complete search history.

(56) References Cited

U.S. PATENT DOCUMENTS 6,045,243 A * 4/2000 Muth et al. ............. 362/494
6,250,784 B1   6/2001 Kayama
6,264,353 B1 * 7/2001 Caraher et al. ........... 362/494
6,271,750 B1   8/2001 Brautigam et al.
6,315,437 B1  11/2001 Katz et al.
6,637,917 B1  10/2003 Schwanz et al.
6,695,465 B1   2/2004 Apfelbeck
2003/0193815 A1  10/2003 Mishimagi
2005/0146886 A1 * 7/2005 Furuya et al. ............ 362/494
2005/0190465 A1 * 9/2005 Henion et al. ............ 359/864

FOREIGN PATENT DOCUMENTS

| EP | 1 195 296 A2 | 4/2002 |
| JP | 2002-019519 A | 1/2002 |
| JP | 2002-337606 A | 11/2002 |

* cited by examiner

*Primary Examiner*—Sandra O'Shea
*Assistant Examiner*—James W Cranson, Jr
(74) *Attorney, Agent, or Firm*—Foley & Lardner LLP

(57) ABSTRACT

A mirror assembly for a vehicle includes an opening, a mirror housing having a window portion, a mirror unit positioned over the opening, and a light unit. The light unit includes a lamp lens positioned over the window portion, a light source arranged in the mirror housing at a position closer to a front side of the vehicle than the mirror unit, and a light distribution control unit for controlling light distribution so that light from the light source is distributed to a range from the outer side to the back side of the vehicle.

16 Claims, 4 Drawing Sheets

US 7,140,757 B2

VEHICLE MIRROR ASSEMBLY THAT INCLUDES LIGHT UNIT

CROSS-REFERENCE TO RELATED APPLICATIONS

The present document incorporates by reference the entire contents of Japanese priority document, 2003-427574 filed in Japan on Dec. 24, 2003.

BACKGROUND OF THE INVENTION

1) Field of the Invention

The present invention relates to a mirror assembly that is used for a vehicle and that includes a light unit.

2) Description of the Related Art

Vehicle mirror assemblies that include a light unit are disclosed in, for example, Japanese Patent Application Laid Open (JP-A) No. 2002-019519, JP-A No. 2002-337606, and U.S. Pat. Ser. No. 6,695,465 B2.

Such a mirror assembly is attached to an outer surface of a vehicle. The mirror assembly includes a mirror housing and a light unit. A portion ranging from a front side to an outer side of the mirror housing is closed, and a portion in a back side thereof is open. A window portion is provided in a part of at least the outer side portion of the closed portion. The light unit includes a lamp lens positioned in the window portion, a lamp housing for forming a lamp room together with the lamp lens, and a light source such as a light emitting diode (LED) arranged in the lamp room.

If the light source in the light unit is lit, the light emitted from the light source passes through the lamp lens and is radiated to the exterior of the outside mirror assembly ranging from the outer side to the back side of the vehicle. With this radiation, the light unit of the outside mirror assembly performs a turn lamp function such as a signal lamp.

However, the lamp lenses of the light units of some of the mirror assemblies project from the mirror housings making the appearance of the mirror assembly bad. If the lamp lens is to be completely enclosed within the mirror housing, the mirror housing becomes bulkier.

SUMMARY OF THE INVENTION

It is an object of the present invention to solve at least the problems in the conventional technology.

A mirror assembly according to one aspect of the present invention is attached on an outer surface of a vehicle, and includes a mirror housing of which a portion ranging from a front side to an outer side of the mirror housing is closed and a portion on a back side thereof is open, and that includes a window portion in at least a part of the outer side of the portion that is closed; a mirror unit that is provided inside the mirror housing and is positioned in the portion that is open; and a light unit that is provided inside the mirror housing and radiates light in a direction that is oblique to the outer surface of the vehicle where the mirror assembly is attached. The light unit includes a lamp lens that is positioned in the window portion, the lamp lens having an outer surface that is substantially at same level as an outer surface of the mirror housing, a light source that is arranged inside the mirror housing at a position that is closer to the front side than a position at which the mirror unit is arranged, and a light-distribution control unit, provided in the lamp lens, for controlling light distribution so that light from the light source is distributed to a predetermined range covering from the outer side to the back side.

The other objects, features, and advantages of the present invention are specifically set forth in or will become apparent from the following detailed description of the invention when read in conjunction with the accompanying drawings.

DETAILED DESCRIPTION

Exemplary embodiments of a mirror assembly that includes a light unit according to the present invention are explained in detail below with reference to the accompanying drawings. It is noted that the present invention is not limited by the embodiments.

FIG. 1 to FIG. 5 depicts some aspects of a mirror assembly that includes a light unit according to a first embodiment of the present invention. As shown in the figures, reference sign F indicates the front side of a car (vehicle) C (in the travel direction of the car C). Reference sign "B" indicates the back side of the car C. Reference sign "I" indicates the inner side of the car C (central part). Reference sign "O" indicates the outer side of the car C (side part). Reference sign "Up" indicates the upper side when viewed from the driver's seat. Reference sign "Lo" indicates the lower side when viewed from the driver's seat. Reference sign "L" indicates the left side when viewed from the driver's seat. Reference sign "R" indicates the right side when viewed from the driver's seat.

Figure 1:
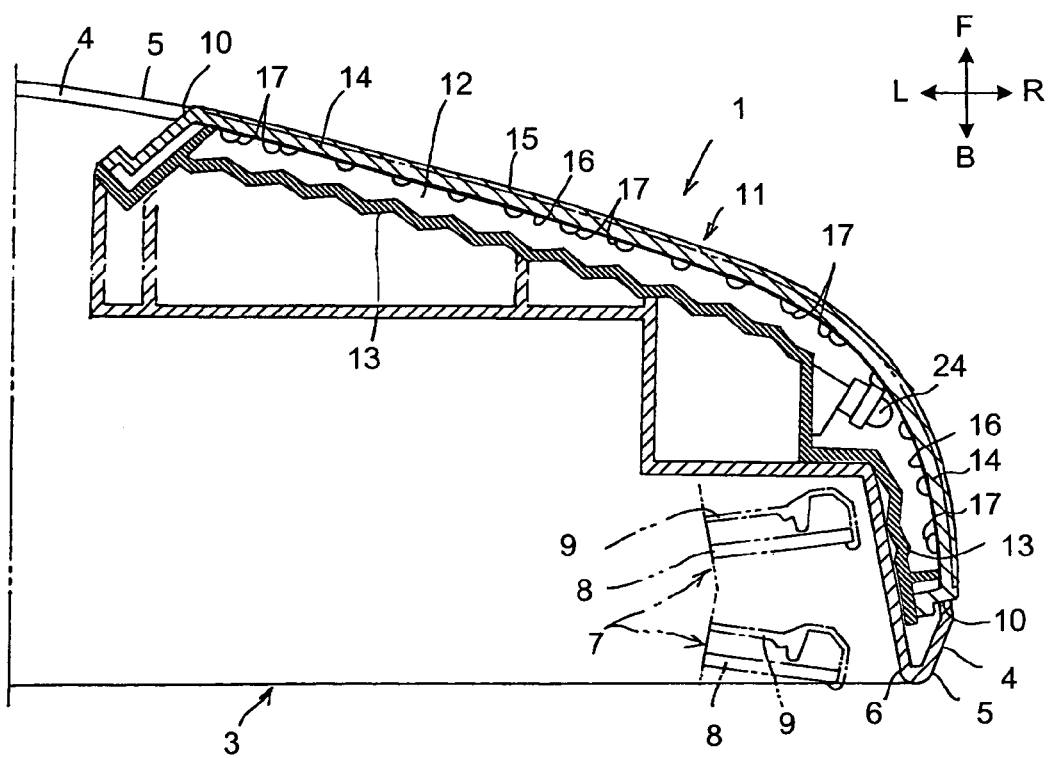
FIG. 1 is a cross section of a mirror assembly that includes a light unit according to a first embodiment of the present invention.

As shown in FIG. 1, reference sign 1 indicates the mirror assembly according to the first embodiment that is a door mirror for a car in this embodiment. The door mirror 1 of the first embodiment is mounted on doors D in both sides of the car C. The door mirror 1 includes a base 2 fixed to the door D, a shaft (not shown) provided in the base 2, and a mirror assembly 3 rotatably mounted on the shaft through a "power foldaway mechanism" (or electric retraction mechanism) (not shown).

Figure 2:
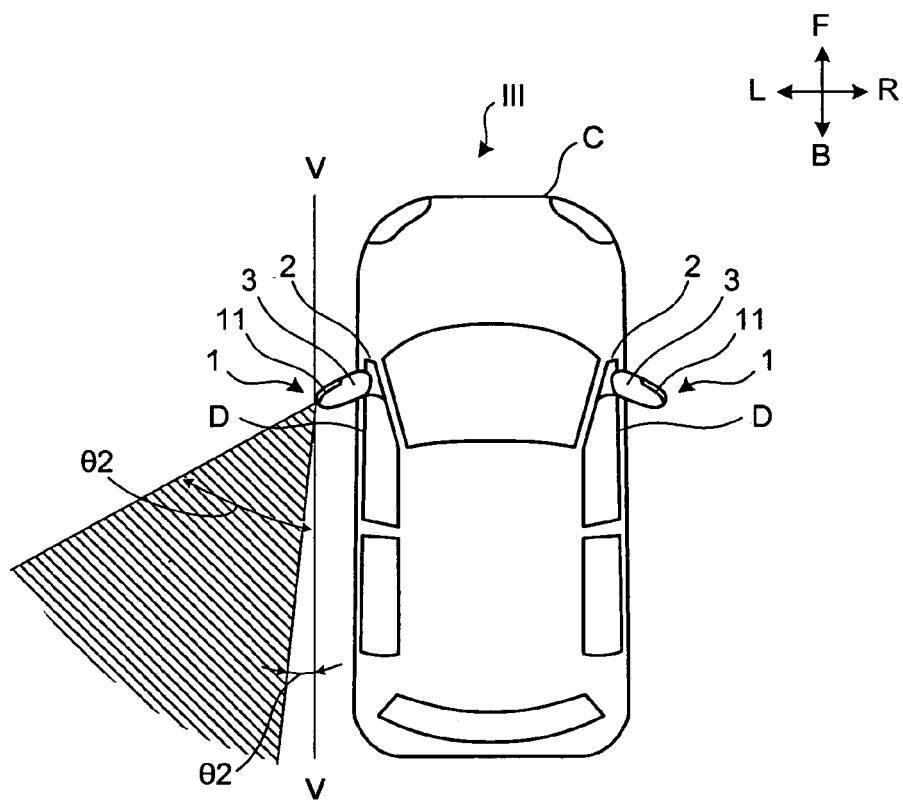
FIG. 2 is a schematic for explaining a light distribution range of a turn lamp function that is mounted on the vehicle when viewed from above.
Figure 3:
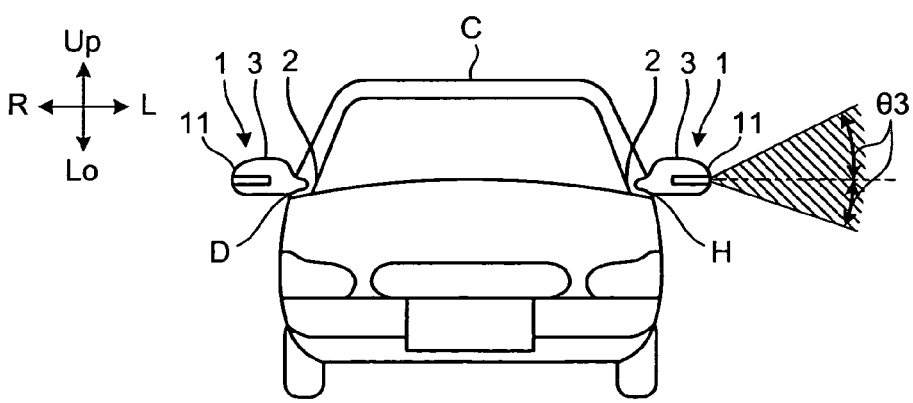
FIG. 3 is a schematic for explaining the light distribution range when viewed from the front side of the vehicle in a direction shown by an arrow III in FIG. 2.

The mirror assembly 3 electrically rotates between a use position (the position as shown in FIG. 2 and FIG. 3) and a rearward retracted position (not shown) with respect to the base 2 by the electric retraction mechanism. For shock absorption, the mirror assembly 3 rotates frontward F and backward B by the clutch action of the electric retraction mechanism.

As shown in FIG. 1, the mirror assembly 3 includes a mirror housing (or, a mirror body, a mirror cover) 4. A portion 5 ranging from the front side F to the outer side O of the mirror housing 4 is closed, and a portion 6 in the back side B thereof is open. The portion closed 5 of the mirror housing 4 has a curved portion ranging from a corner between the front side F and the outer side O to the outer side O.

A mirror unit 7 is mounted inside the mirror housing 4 through a power unit (not shown) so as to be tiltable upward, downward, rightward, and leftward. As shown in FIG. 1, the mirror unit 7 includes a mirror body 8 having a reflecting surface, and a mirror holder 9 for holding the mirror body 8. The mirror holder 9 is fixed to the power unit. The reflecting surface of the mirror body 8 is provided so as to be tiltable upward, downward, rightward, and leftward with respect to an opening 6 of the mirror housing 4. How the mirror unit 7 is tilted laterally is indicated by phantom lines of FIG. 1.

As shown in FIG. 1, a window portion 10 elongated in the horizontal direction is provided in a portion ranging from almost half the length of the mirror housing in the horizontal direction to the outer side O and at an almost center in the vertical direction of the portion closed of the mirror housing 4. A light unit 11 (hereinafter, "lamp unit 11") is arranged in the window portion 10 of the mirror housing 4. The lamp unit 11 is fixed to the interior of the mirror housing 4.

Figure 5:
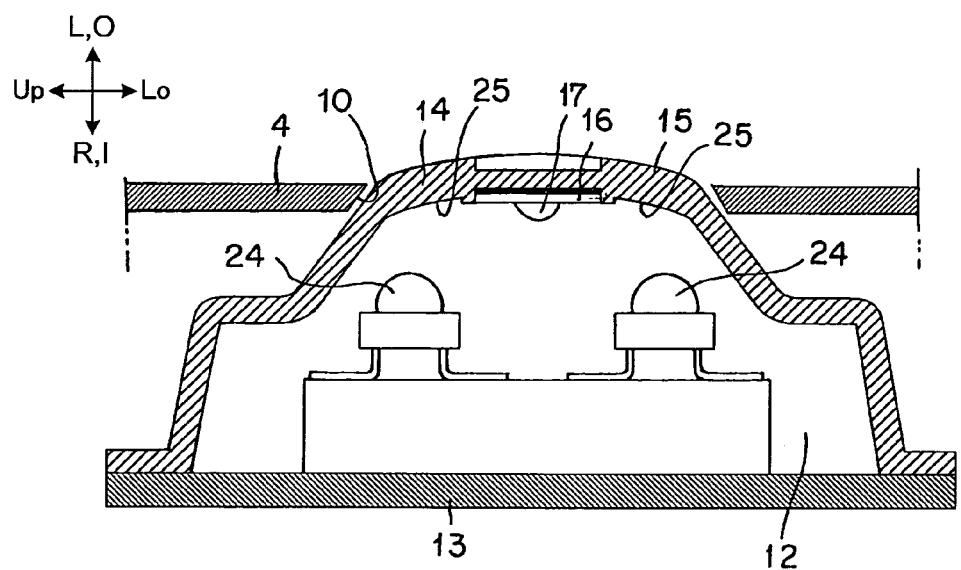
FIG. 5 is a cross section taken along a line V—V shown in FIG. 4.

The lamp unit 11 has an elongated shape in the horizontal direction the same as that of the window portion 10. As shown in FIG. 1, the lamp unit 11 has a lamp housing 13 and a lamp lens 14 that form a lamp room 12. As shown in FIG. 5, a projection 15 is formed at half the height of the lamp lens 14 in the vertical direction. The projection 15 is arranged in the window portion 10. As shown in FIG. 1 and FIG. 5, the shape of the projection 15 of the lamp lens 14 is formed so as to fit along the shape of the mirror housing 4. Therefore, the outer surface of the projection 15 and the outer surface of the mirror housing 4 are almost flush with each other. In other words, the lamp lens 14 has a curved portion, the same as the mirror housing 4, in a portion ranging from a corner between the front side F and the outer side O to the outer side O of the vehicle.

As shown in FIG. 1 and FIG. 5, a flexible plate 16 made of glass epoxy resin or so is provided in the interior (face opposite to the lamp room 12) of the projection 15 of the lamp lens 14, and the rear face of the flexible plate 16 is fixed to the lamp lens 14 so as to fit along the shape of its cross section. A plurality of LEDs 17 as light sources is mounted on the surface of the flexible plate 16 at a substantially equal space. Such surface mounting of the LEDs 17 is carried out by bonding chips made of epoxy resin or so for the LEDs 17 to the surface of the flexible plate 16, covering the chips with lenses made of transparent resin, and fixing the lenses to the surface of the flexible plate 16. The LEDs 17 emit mainly decorative light.

Figure 4:
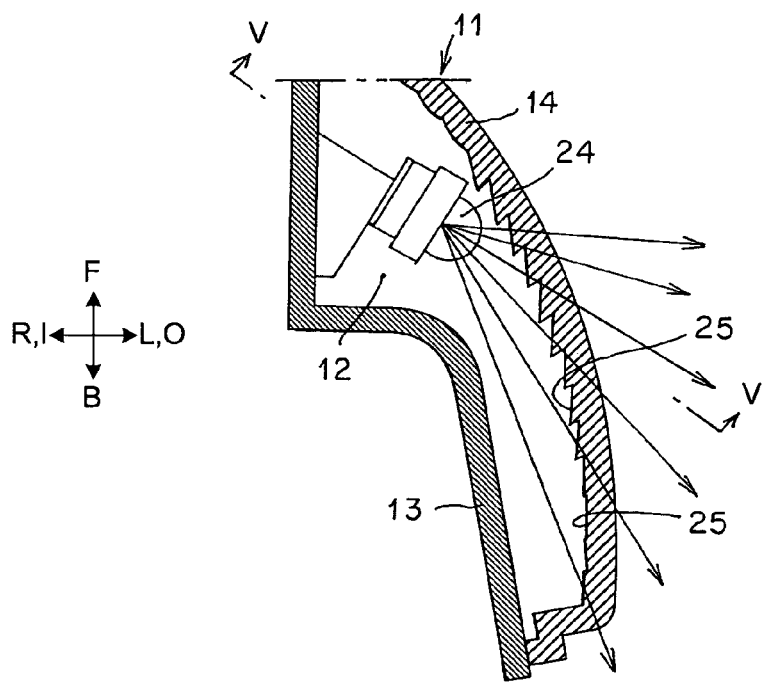
FIG. 4 is a cross section of the turn lamp function near the LED.

Two pieces of LEDs 24 for a turn lamp function are provided in the lamp unit 11. As shown in FIG. 4 and FIG. 5, the LED 24 is arranged in a position toward the front side F facing away from a tilt movement range of the mirror unit 7, the position being in the curved portion of the lamp lens 14 of the mirror housing 4, i.e., in the lamp room 12 of the lamp unit 11. A prism 25 that serves as a light-distribution control unit is provided in a portion of the outer side 0 of the curved portion of the lamp lens 14. The light-distribution control unit controls distribution of light from the LEDs 24 toward a predetermined range (indicated by solid lines with arrows of FIG. 4) that covers from the outer side O to the back side B of the vehicle.

As explained above, the lamp unit 11 has a unit configuration that includes the lamp housing 13, the lamp lens 14, the LEDs 17, and the LEDs 24.

The operation of the mirror assembly according to the first embodiment (the door mirror 1 of the first embodiment) is explained below.

The LED 17 is first lit to emit light. Then, the light emitted from the LED 17 is reflected by a reflecting surface (not shown) of the lamp housing 13, and the light reflected passes through the lamp lens 14 and is illuminated to the exterior of the vehicle ranging from the front side F to the outer side O. Decorative light is obtained by this illumination.

The LED 24 is lit to emit light. Then, the light emitted from the LED 24 passes through the prism 25 for controlling light distribution of the lamp lens 14, and distribution of the light is controlled so that the light is illuminated to the exterior in a predetermined range covering from the outer side O to the back side B, as indicated by the solid lines with arrows of FIG. 4. The range of the light emitted from the LED 24 is shaded in FIG. 2 and FIG. 3. This range satisfies the light distribution of the turn lamp function. As shown in the figures, $\theta 1$ is 60 degrees and $\theta 2$ is 5 degrees with respect to the travel axis V—V of the car C in FIG. 2, and $\theta 3$ is 15 degrees with respect to the horizontal axis H—H of the car C in FIG. 3. Based on the light distribution, the door mirror 1 of the first embodiment obtains the decorative light by the LEDs 17 and obtains the turn lamp function by the LEDs 24. Although the range of the light distribution by the door mirror 1 mounted on the door D on the left side L of the car C is explained with respect to FIG. 2 and FIG. 3, the range of the light distribution on the right side R of the car C is obtained in the same manner as explained above.

In the door mirror 1, the LEDs 17 and 24 are LEDs that emit light of yellow or amber or LEDs that emit white light but not LEDs that emit red light. If the LEDs that emit white light are to be used, a colored lens of any color except for red color, for example, a colored lens of yellow or amber is used.

The effect of the mirror assembly according to the first embodiment (the door mirror 1 of the first embodiment) is explained below.

Because the door mirror 1 of the first embodiment includes the prism 25 as the light distribution control unit, the LED 24 is arranged in a position of the interior of the mirror housing 4, the position being facing away from the tilt movement range of the mirror unit 7, which allows the outer surface of the lamp lens 14 to fit along the outer surface of the mirror housing 4. At the same time, the light distribution can be controlled so that the light is illuminated to the predetermined range (the range shaded in FIG. 2 and FIG. 3) covering from the outer side O to the back side B of the vehicle. As a result, in the door mirror 1 of the first embodiment, the lamp lens 14 of the lamp unit 11 does not project from the outer surface of the mirror housing 4. Furthermore, since there is no need to expand the mirror housing 4 outwardly in order to prevent projection of the lamp lens 14 from the mirror housing 4, the overall door mirror 1 is made compact, smart, and sharp in shape. Therefore, the appearance of the door mirror 1 of the first embodiment is improved.

Since the door mirror 1 of the first embodiment includes the LEDs 24 for the turn lamp function, the door mirror 1 also serves as the turn lamp function. In order to illuminate the range (the range shaded in FIG. 2 and FIG. 3) that satisfies the turn lamp function, it is preferable to arrange the light unit in the outer side O of the curved portion of the door mirror 1 (the curved portion of the mirror housing 4). However, as shown in FIG. 1, the mirror unit 7 of the door mirror 1 is tiltable. Therefore, the light unit needs to be arranged in a state where it is projected from the curved portion toward the outer side O so as not to block a tilt movement of the mirror unit 7. In this case, the light unit has a shape such that it extends off the outer surface (design) of the door mirror 1 (mirror housing 4), which is not preferable from the viewpoint of appearance. On the other hands, the door mirror 1 of the first embodiment has the prism 25 for controlling light distribution provided in the lamp lens 14. Therefore, the LED 24 can be arranged in the curved portion of the mirror housing 4 that is the position toward the front side F where the tilt movement of the mirror unit 7 is not blocked. Consequently, the lamp lens 14 can be made to fit along the outer surface (design) of the mirror housing 4, and at the same time, it is possible to adequately satisfy the light distribution range of the turn lamp function.

Furthermore, the door mirror 1 uses the LED 24 as a light source having the turn lamp function. Therefore, it is most adequate to make the lamp unit 11 more compact and slimmer.

In the door mirror 1, the LED 24 is arranged in a position toward the front side F facing away from the tilt movement range of the mirror unit 7. Therefore, the LED 24 may not block the tilt movement of the mirror unit 7.

In the door mirror 1, the light unit has a unit configuration as the lamp unit 11. Therefore, by forming the window portion 10 in the mirror housing 4, the lamp unit 11 can be applied to existing outside mirror assemblies. Moreover, the lamp unit 11 can be applied to various types of outside mirror assemblies for vehicles in which the shape of the mirror housing is almost approximate or similar to the shape of the outside mirror assemblies. Therefore, it is possible to obtain general versatility and a common feature of the lamp unit 11.

In the door mirror 1, the light-distribution control unit is the prism 25 integrally provided in the lamp lens 14. Therefore, it is most adequate to make the lamp unit 11 more compact and slimmer.

In the door mirror 1, the portion closed 5 of the mirror housing 4 has a curved portion ranging from the corner between the front side F and the outer side O to the outer side O, while the LED 24 is arranged in a position toward the front side F of the interior of the curved portion of the mirror housing 4, facing away from the tilt movement range of the mirror unit 7. Consequently, in the door mirror 1, the lamp lens 14 does not project from the outer surface of the mirror housing 4, and the curved portion makes the overall door mirror 1 further smart and sharp in shape. With this feature, the appearance of the door mirror 1 is further improved.

Figure 6:
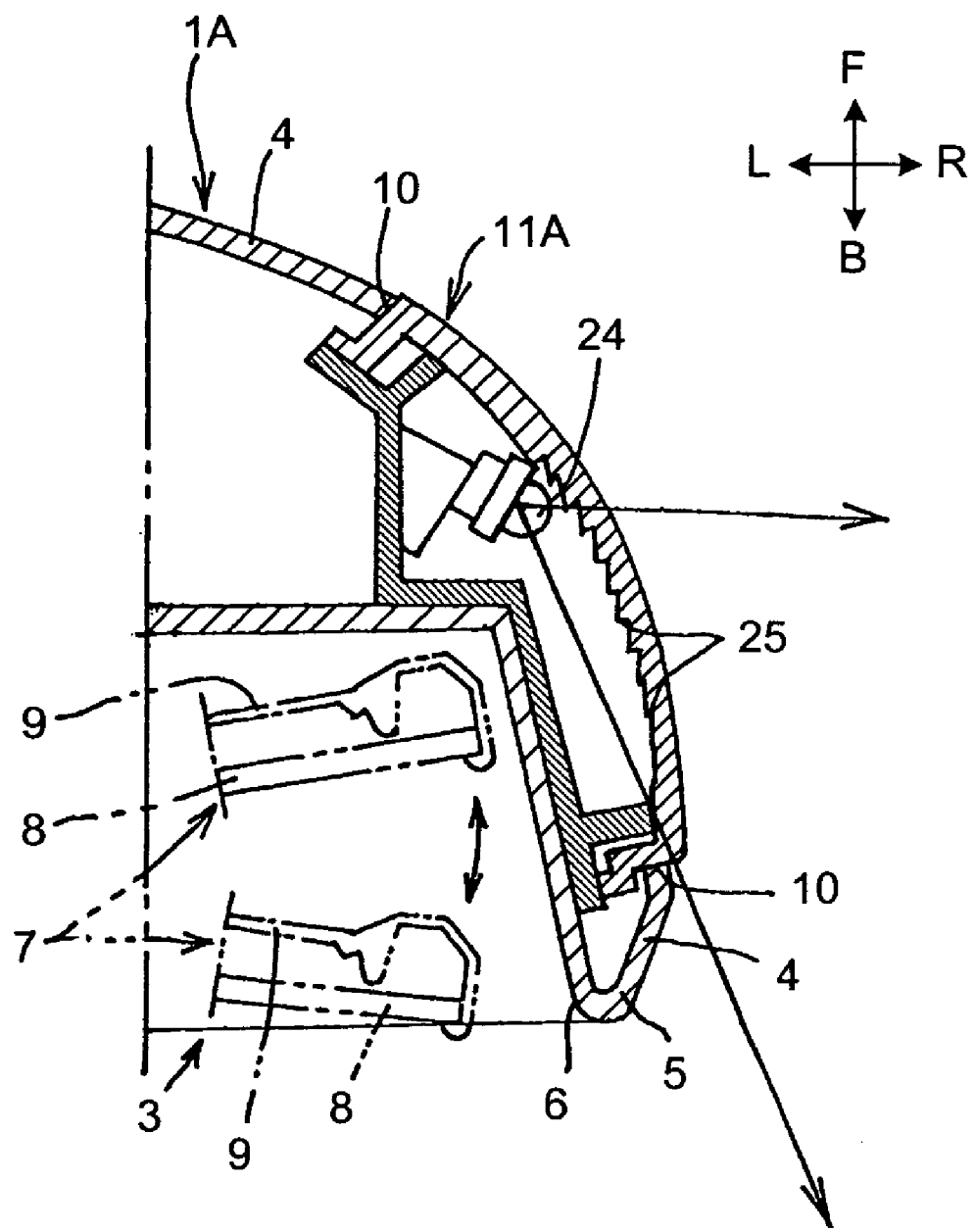
FIG. 6 is a cross section of a turn lamp function near the LED in a mirror assembly that includes a light unit according to a second embodiment of the present invention.

FIG. 6 depicts a mirror assembly that includes a light unit according to a second embodiment of the present invention. The reference signs of FIG. 6 the same as these of FIG. 1 to FIG. 5 indicate the same function as explained above.

A door mirror 1A of the second embodiment is a lamp unit 11A (light unit) such that the LEDs 17 for a decorative function are omitted from the door mirror 1 of the first embodiment. The door mirror 1A of the second embodiment can achieve almost the same operation and effect as these of the door mirror 1 of the first embodiment. Particularly, the door mirror 1A can be provided at a cost lower than the door mirror 1 of the first embodiment.

Although a door mirror is explained in the first and the second embodiments, the present invention can be mirror assemblies used in the vehicles such as fender mirrors or track mirrors.

In the first and the second embodiments, the mirror housing 4 is configured differently from the lamp housing 13 of the lamp unit 11 that forms the unit configuration. However, in the present invention, the lamp unit 11 may not have the unit configuration, but the mirror housing can be shared for the lamp housing. In this case, a sharing portion of the mirror housing for the lamp housing forms the lamp room using the lamp lens in the same manner as that of the lamp housing, and the LED 24 for a turn lamp is arranged therein.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A mirror assembly that is attached on an outer surface of a vehicle, comprising:
    a mirror housing of which a portion ranging from a front side to an outer side of the mirror housing is closed and a portion on a back side thereof is open, and that includes a window portion in at least a part of the outer side of the portion that is closed;
    a mirror unit that is provided inside the mirror housing and is positioned in the portion that is open; and
    a light unit that is provided inside the mirror housing and radiates light in a direction that is oblique to the outer surface of the vehicle where the mirror assembly is attached, wherein
    the light unit includes
    a lamp lens that is positioned in the window portion, the lamp lens having an outer surface that is substantially at same level as an outer surface of the mirror housing,
    a light source that is arranged inside the mirror housing at a position that is closer to the front side than a position at which the mirror unit is arranged, and
    a light-distribution control unit, provided in the lamp lens, for controlling light distribution so that light from the light source is distributed to a predetermined range covering from the outer side to the back side of the vehicle,
    wherein
    the mirror unit is tiltably mounted, and
    the light source is arranged at a position that is closer to the front side than the mirror unit, the position outside a range in which the mirror unit is tilted.

2. The mirror assembly according to claim 1, wherein the light unit includes a turn lamp function.

3. The mirror assembly according to claim 1, wherein the light unit includes a turn lamp function, and the light source is a light emitting diode having the turn lamp function.

4. The mirror assembly according to claim 1, wherein the light unit has a unit configuration that includes
    a lamp room that is formed with a lamp housing and the lamp lens, and
    the light source arranged in the lamp room.

5. The mirror assembly according to claim 1,
    wherein the light distribution control unit is a prism that is integrally provided in the lamp lens.

6. A mirror assembly that is attached on an outer surface of a vehicle, comprising:
    a mirror housing of which a portion ranging from a front side to an outer side of the mirror housing is closed and a portion on a back side thereof is open, and that includes a window portion in at least a part of the outer side of the portion that is closed;
    a mirror unit that is provided inside the mirror housing and is positioned in the portion that is open; and a light unit that is provided inside the mirror housing and radiates light in a direction that is obliQue to the outer surface of the vehicle where the mirror assembly is attached, wherein the light unit includes a lamp lens that is positioned in the window portion, the lamp lens having an outer surface that is substantially at same level as an outer surface of the mirror housing, a light source that is arranged inside the mirror housing at a position that is closer to the front side than a position at which the mirror unit is arranged, and a light-distribution control unit, provided in the lamp lens, for controlling light distribution so that light from the light source is distributed to a predetermined range covering from the outer side to the back side of the vehicle, wherein in the portion that is closed, a portion ranging from a corner between the front side and the outer side to the outer side is a curved portion, and the light source is arranged inside the curved portion at a position closer to the front side than the position at which the mirror unit is arranged.

7. The mirror assembly according to claim 6, wherein the light unit includes a turn lamp function.

8. The mirror assembly according to claim 6, wherein the light unit includes a turn lamp function, and the light source is a light emitting diode having the turn lamp function.

9. The mirror assembly according to claim 6, wherein the light unit has a unit configuration that includes a lamp room that is formed with a lamp housing and the lamp lens, and the light source arranged in the lamp room.

10. The mirror assembly according to claim 6, wherein the light distribution control unit is a prism that is integrally provided in the lamp lens.

11. A mirror assembly that is attached on an outer surface of a vehicle, comprising:

a mirror housing of which a portion ranging from a front side to an outer side of the mirror housing is closed and a portion on a back side thereof is open, and that includes a window portion in at least a part of the outer side of the portion that is closed;

a mirror unit that is provided inside the mirror housing and is positioned in the portion that is open; and a light unit that is provided inside the mirror housing and radiates light in a direction that is oblique to the outer surface of the vehicle where the mirror assembly is attached, wherein the light unit includes a lamp lens that is positioned in the window portion, the lamp lens having an outer surface that is substantially at.same level as an outer surface of the mirror housing, a light source that is arranged inside the mirror housing at a position that is closer to the front side than a position at which the mirror unit is arranged, and a light-distribution control unit, provided in the lamp lens, for controlling light distribution so that light from the light source is distributed to a predetermined range covering from the outer side to the back side of the vehicle, wherein the light-distribution control unit controls light distribution so that light from the light source is distributed to a range covering from five degrees to sixty degrees with respect to the travel axis of the vehicle.

12. The mirror assembly according to claim 11, wherein the light unit includes a turn lamp function.

13. The mirror assembly according to claim 11, wherein the light unit includes a turn lamp function, and the light source is a light emitting diode having the turn lamp function.

14. The mirror assembly according to claim 11, wherein the light unit has a unit configuration that includes a lamp room that is formed with a lamp housing and the lamp lens, and the light source arranged in the lamp room.

15. The mirror assembly according to claim 11, wherein the light distribution control unit is a prism that is integrally provided in the lamp lens, and wherein the prism corresponds to an irregularly shaped inner surface of the mirror housing facing the light source.

16. The mirror assembly according to claim 11, wherein the portion that is open is included in a first surface, and wherein the window portion is included in a second surface that is different from the first surface.

* * * * *